(12) United States Patent
Nittoor

(10) Patent No.: US 10,585,946 B2
(45) Date of Patent: Mar. 10, 2020

(54) SYSTEM AND METHOD FOR GENERATING A MODEL FOR CREATING GRAPHS OF REGULAR DEGREE

(71) Applicant: Vivek Sathyanarayana Nittoor, Bengaluru (IN)

(72) Inventor: Vivek Sathyanarayana Nittoor, Bengaluru (IN)

(73) Assignee: Vivek Sathyanarayana Nittoor, Bengaluru (IN)

( * ) Notice: Subject to any disclaimer, the term of this patent is extended or adjusted under 35 U.S.C. 154(b) by 0 days.

(21) Appl. No.: 15/779,525

(22) PCT Filed: Nov. 25, 2016

(86) PCT No.: PCT/IN2016/000277
§ 371 (c)(1),
(2) Date: May 28, 2018

(87) PCT Pub. No.: WO2017/090053
PCT Pub. Date: Jun. 1, 2017

(65) Prior Publication Data
US 2018/0349510 A1    Dec. 6, 2018

(30) Foreign Application Priority Data
Nov. 26, 2015 (IN) .......................... 6351/CHE/2015

(51) Int. Cl.
*G06F 17/30* (2006.01)
*G06F 17/16* (2006.01)
(Continued)

(52) U.S. Cl.
CPC ...... *G06F 16/9024* (2019.01); *G06F 16/9038* (2019.01); *G06F 17/16* (2013.01); *G06N 5/022* (2013.01); *G06N 20/00* (2019.01)

(58) Field of Classification Search
CPC .. G06F 16/9024; G06F 16/9038; G06F 17/16; G06N 5/022; G06N 20/00
See application file for complete search history.

(56) References Cited

U.S. PATENT DOCUMENTS

2012/0096043 A1* 4/2012 Stevens, Jr. ......... G06F 16/9024
707/798

OTHER PUBLICATIONS

Gabor Gevay and Tomaz Pisanski; "Kronecker covers, V-construction, unit-distance graphs and isometric point-circle configurations;" 21 pagtes, Bolyai Institute, University of Szeged Aradi; Szeged, Hungary (Year: 2012).*

(Continued)

*Primary Examiner* — Edward Martello
(74) *Attorney, Agent, or Firm* — Barry Choobin; Patent 360 LLC

(57) ABSTRACT

The embodiments herein provide a system and method for compact representation of graphs of regular degree. The graphs of regular degree are represented in a compact manner using a plurality of representation methods. The compact representation of the graphs of regular degree allows ease of understanding, storage and transmission of the graphs. The compact representation of graphs is a method for compression of graphs and representation of graphs with the minimum number of variables thereby enabling the storage and transmission of data in graph format efficiently. Further, the compact representation of graphs allows presentation of infinite family representation of Hamiltonian bipartite graphs of regular degree.

20 Claims, 7 Drawing Sheets

(51) Int. Cl.
    *G06N 5/02*           (2006.01)
    *G06N 99/00*         (2019.01)
    *G06F 16/901*       (2019.01)
    *G06N 20/00*        (2019.01)
    *G06F 16/9038*     (2019.01)

(56) References Cited

OTHER PUBLICATIONS

Haiko Muller; "HAMILTONian circuits in chordal bipartite graphs," Discrete Mathematics 156 (1996) pp. 291-298; 1996 Elsevier Science B.V. All rights reserved (Year: 1996).*

* cited by examiner

SYSTEM AND METHOD FOR GENERATING A MODEL FOR CREATING GRAPHS OF REGULAR DEGREE

CROSS-REFERENCE TO RELATED APPLICATIONS

The embodiments herein claims the priority of the Indian Provisional Patent Application filed on Nov. 26, 2015 with the number 6351/CHE/2015 and entitled, "A SYSTEM AND METHOD FOR A COMPACT REPRESENTATION OF GRAPHS OF REGULAR DEGREE", and the contents of which are included in entirety as reference herein. The present application is filed as a national phase application filed in consequence/continuation of the PCT application with serial number PCT/IN2016/000277 filed on Nov. 25, 2016 with the tile and the contents of which are included entirely as reference herein.

BACKGROUND

Technical Field

The embodiments herein are generally related to graph theory. The embodiments herein are particularly related to the representation or creation of graphs. The embodiments herein are more particularly related to a system and method for generating a model for creating graphs of a regular degree for ease of transmission and storage. The embodiments herein are also related to a system and method for creating graphs of a regular degree in a compressed format to minimize digital storage space for storing data.

Description of the Related Art

In the field of mathematics and computer science, graph theory refers to the study of graphs. The graphs provide mathematical structure used to model relations between a plurality of objects. A graph generally includes a plurality of vertices. The plurality of vertices is connected to each other using one or more edges. Graphs are one of the prime objects of study in discrete mathematics and theoretical computer science.

In graph theory, a regular graph is a graph where each vertex has the same number of neighbors, i.e. every vertex has the same degree of valency. A regular graph with vertices of "k" is called k-regular graph or regular graph of degree k.

The regular graphs are represented in a plurality of ways. The conventional representation of regular graphs poses serious problems when the number of variables increases. Further, when there has to be an infinite representation of regular graphs, the conventional representation of regular graphs does not provide adequate results.

Hence, there is a need for a graph representation that represents graphs of a regular degree in an easier manner. Further, there is a need for a graph representation method for representing an infinite family of graphs without much difficulty.

The above-mentioned shortcomings, disadvantages, and problems are addressed herein and which will be understood by reading and studying the following specification.

OBJECTS OF THE EMBODIMENTS HEREIN

The various embodiments herein provide a system and method for generating a model for creating of graphs of a regular degree in a compact manner.

The primary object of the embodiments herein is to provide a compact representation of graphs of a regular degree.

Another object of the embodiments herein is to represent an infinite family of graphs of regular degree with a comparatively less number of variables.

Yet another object of the embodiments herein is to represent a trivalent Hamiltonian bipartite graph with lesser number of variables.

Yet another object of the embodiments herein is to provide a compact representation of simple graphs, i.e., graphs that do not have multiple edges between the same set of vertices.

Yet another object of the embodiments herein is to represent a trivalent Hamiltonian graph with the lesser number of variables.

Yet another object of the embodiments herein is to represent an arbitrary graph of regular degree with a lesser number of variables.

Yet another object of the embodiments herein is to represent/create an arbitrary bipartite graph of regular degree with less number of variables.

Yet another object of the embodiments herein is to provide an alternate representation method for Hamiltonian bipartite graph of a regular degree.

Yet another object of the embodiments herein is to provide an alternate representation method for Hamiltonian graph of a regular degree.

Yet another object of the embodiments herein is to develop a system and method for generating a model for creating graphs of regular degree for ease of storage and transmission.

These and other objects and advantages of the embodiments herein become readily apparent from the following detailed description taken in conjunction with the accompanying drawings.

SUMMARY OF THE EMBODIMENTS HEREIN

The various embodiments of the embodiments herein provide a system and method for generating a model for creating graphs of a regular degree. The graphs of regular degree are represented in a compact manner using a plurality of representation methods.

The model for creation of any trivalent Hamiltonian bipartite graph with the lesser number of variables is achieved by D3 chord index representation (model) for a trivalent Hamiltonian bipartite graph.

The model for creation of any trivalent Hamiltonian graph with the lesser number of variables is achieved by E3 chord representation (model) of a trivalent Hamiltonian graph.

The model for creation of any Hamiltonian bipartite graph of regular degree with lesser number of variables is achieved by generalized Dn chord index representation (model) of a Hamilton an bipartite graph of a regular degree.

The model for creation of any Hamiltonian graph of regular degree with a lesser number of variables is achieved by generalized En chord index representation (model) of a Hamiltonian graph of a regular degree.

The model for creation of any arbitrary graph of regular degree with a lesser number of variables is achieved by Pn representation of an arbitrary graph of a regular degree.

The BPn representation of an arbitrary bipartite graph of regular degree provides art alternate representation method for Hamilton bipartite graph of a regular degree.

$\{p_3 \ldots p_k\}$ is an alternate representation method for Hamiltonian bipartite graph of regular degree k and order 2mk.

$\{p_3 \ldots p_k\}$ representation method for an arbitrary Hamiltonian graph of regular degree k and order mk.

According to an embodiments herein, generalized Dn chord index representation of D3 chord index representation for a trivalent Hamiltonian bipartite graph According to an embodiment of the embodiments herein, generalized En chord index representation of a Hamiltonian graph of regular degree is a generalization of E3 chord index representation for a trivalent Hamiltonian graph.

According to an embodiment herein, not every D3 chord index representation represents a trivalent Hamiltonian bipartite graph, but every trivalent Hamiltonian bipartite graph has a D3chord index representation.

According to an embodiment herein, not every E3chord index representation represents a trivalent Hamiltonian graph, but every trivalent Hamiltonian graph has an B chord index representation.

According to an embodiment herein, not every generalized Dn chord index representation represents a Hamiltonian bipartite graph of regular degree, but every Hamiltonian bipartite graph of regular degree has a generalized Dn chord index representation.

According to an embodiment herein, not every generalized En chord index representation represents a Hamiltonian graph of regular degree, but every Hamiltonian graph of regular degree has a generalized En chord index representation.

According to an embodiment herein, any arbitrary bipartite graph of regular degree k, and order 2km can be represented by a set of permutations, $\{p_1, p_2, \ldots, p_k\}$ where $p_i \in S_m$ for $1 \le i \le k$, and $p_1 = I_m$, the identity permutation on m elements, and $\{p_1, p_2, \ldots, p_k\}$ are compatible permutations. The $S_m$ is the symmetric group of degree m.

The embodiments provide a notional permutation method for representing a Hamiltonian bipartite graph and can also be generalized to be equivalent to the generalized Dn chord index representation of Hamiltonian bipartite graph of a regular degree.

According to an embodiment herein, the representation of graph is a model for creation of a graph.

The various embodiments herein provide the computer-implemented system for generating a model for creating graphs of a regular degree. The system includes a user interface configured to receive a plurality of details of a graph system, a graph generation module communicably coupled to the user interface and configured for generating graphs of regular degree, a graph compression module communicably coupled with the graph generation module and is configured to compress the generated graph, and a database configured for storing a plurality of details of the graph system and the compact representation of the generated graphs.

The user interface is configured to receive the plurality of details through a computing device. Further, the graph is generated in a predetermined format using a plurality of pre-determined parameters.

According to an embodiment herein, the graph generation module is further configured for representing an infinite family of Hamiltonian bipartite graphs of regular degree with Dn chord index notation.

According to an embodiment herein, the graph generation module is further configured to represent an arbitrary graph of regular degree k and order "ink" by a set of permutations $\{p_1, p_2, \ldots p_k\}$, where $p_i \in S_m$ for $1 \le i \le k$, and $p_1 = I_m$, the identity permutation on m elements, and $\{p_1, p_2, \ldots p_k\}$ are compatible permutations.

According to an embodiment herein, the graph generation module is further configured to represent an arbitrary bipartite graph of regular degree k and order "2mk" by a set, of permutations $\{p_1, p_2, \ldots p_k\}$, where $p_i \in S_m$ for $1 \le i \le k$, and $p_1 = I_m$, the identity permutation on m elements, and $\{p_1, p_2, \ldots p_k\}$ are compatible permutations.

According to an embodiment herein, the graph generation module is further configured to generate and represent Hamiltonian bipartite graph of regular degree with a lesser number of variables through a generalized Dn chord index representation of a Hamiltonian bipartite graph of a regular degree.

According to an embodiment herein, the graph representation module represents a Hamiltonian graph of regular degree with a minimum number of variables by a generalized En chord index representation of a Hamiltonian graph of regular degree.

According to an embodiment herein, the graph generation module is further configured to represent an arbitrary graph of regular degree with a minimum number of variables through Pn representation of an arbitrary graph of regular degree.

According to an embodiment herein, the graph generation module is configured to provide an alternate representation for Hamilton bipartite graph of the regular degree through a BPn representation of an arbitrary bipartite graph of a regular degree.

According to an embodiment herein, the graph generation module is configured to provide an alternate representation for Hamilton graph of the regular degree through a Pn representation of an arbitrary graph of a regular degree.

According to an embodiment herein, the graph generation module is provided for creating trivalent graphs with 3m vertices. The embodiment is configured to represent a symmetry factor with permutations represented by $p_1 = I_m$ and $p_2 = (2\ 3\ \ldots\ m\ 1)$, and permutation $p_3 \in S_m$ is said to have symmetry factor b, and wherein b is divided by m when p3 is represented by $p3 = (\hat{q}_3, m/b)\ (m)$, where p3 is obtained by modular multiplication from q̂q3 by symmetry factor b.

According to an embodiment herein, the system further comprises a plurality of file systems configured to automatically convert graphs of categories in a selected application into a compressed form to save a storage space in the database.

According to an embodiment herein, each of the modules includes an administrator module that is configured for monitoring and modifying the activities, wherein the activities are monitored and modified to set a pre-determined threshold, and determine or estimate a type of representation based on the received inputs.

According to an embodiment herein, the computing device is selected from a group consisting of a desktop computer, a laptop computer, a palmtop computer, a cluster computer, a supercomputer, a server, a wearable device, a smart television, a kiosk, a mainframe computer, and a graph rendering system.

The various embodiments herein, provide a computer-implemented method for representing graphs of a regular degree. The method includes, receiving a plurality of details of a graph through a user interface of a computing device, generating a plurality of graphs of regular degree in a predetermined format through a graph generation module, compressing the generated graph using a graph generation module, representing the compressed graph using a graph representation module, and storing a plurality of details of the graph in a database, wherein the plurality of details include details of the received inputs.

According to an embodiment herein, the details of a graph are received through a computing device. Further, the generated plurality of graphs is based on the first set of predetermined parameters. The compressed graphs are compatible with a plurality of computing devices.

According to an embodiment herein, the plurality of details stored in the database includes details of the received inputs, the details of the first set of predetermined parameters, the details of the second set of predetermined parameters, plurality of compressed representation of the graphs, protocols required for compression, plurality of protocols required for representation of the compressed graphs, and the metadata of graphs and the graph system.

According to an embodiment herein, the method further includes representing an infinite family of Hamiltonian bipartite graphs of regular degree with Dn chord index notation.

According to an embodiment herein, the method further comprises representing an arbitrary graph of regular degree k and order "mk" by a set of permutations $\{p_1, p_2 \ldots p_k\}$, where $p_i \in S_m$ for $1 \le i \le k$, and $p_1 = I_m$, the identity permutation on m elements, and $\{p_1, p_2, \ldots p_k\}$ are compatible permutations.

According to an embodiment herein, the method further comprises representing an arbitrary bipartite graph of regular degree k and order "2mk" by a set of permutations $\{p_1, p_2 \ldots p_k\}$, where $p_1 \in S_m$ for $1 \le i \le k$, and $p_1 = i_m$, the identity permutation on m elements, and $\{p_1, p_2, \ldots p_k\}$ are compatible permutations.

According to an embodiment herein, the method is further configured to generate and represent an arbitrary Hamiltonian bipartite graph of regular degree with a minimum number of variables through a generalized Dn chord index representation of a Hamiltonian bipartite graph of a regular degree.

According to an embodiment herein, the method further comprises representing an arbitrary Hamiltonian graph of regular degree with a minimum number of variables by a generalized En chord index representation of a Hamiltonian graph of regular degree.

According to an embodiment herein, the method further comprises representing an arbitrary bipartite graph of regular degree with a minimum number of variables through Pn representation of an arbitrary graph of regular degree.

According to an embodiment herein, the method further comprises providing an alternate representation for Hamilton bipartite graph of the regular degree through a BPn representation of an arbitrary bipartite graph of a regular degree.

According to an embodiment herein, the method further comprises providing an alternate representation for Hamilton bipartite graph of the regular degree through a Pn representation of an arbitrary graph of the regular degree.

According to an embodiment herein, the method is provided for generating a model for creating trivalent graphs with 3 m vertices and trivalent bi-partite graphs with 6 m vertices. The method further comprises representing a symmetry factor with permutations represented by $p_1 = I_m$, and $p_2 = (2\ 3\ \ldots\ m_1)$, and wherein permutation $p_3 \in S_m$ is said to have symmetry factor b, and wherein m is divided b when $p_3$ is represented by $p_3 = (\hat{q}_3, m/b)\ (m)$, and wherein $p_3$ is obtained by modular multiplication from $\hat{q}_3$ by symmetry factor b.

According to an embodiment herein, the method further comprises a plurality of file systems configured to automatically convert graphs of categories in a selected application into a compressed form to save a storage space in the database.

According to an embodiment herein, each of the modules includes an administrator module that is configured for monitoring and modifying the activities, wherein the activities are monitored and modified to set a pre-determined threshold, and determine or estimate a type of representation based on the received inputs.

According to an embodiment herein, the graph representation formats that are introduced as pan of this application are in a compressed format.

According to an embodiment herein, the actual graph or its complete adjacency list are represented in an uncompressed format of the graph.

These and other aspects of the embodiments herein will be better appreciated and understood when considered in conjunction with the following description and the accompanying drawings. It should be understood, however, that the following descriptions, while indicating the preferred embodiments and numerous specific details thereof, are given by way of an illustration and not of a limitation. Many changes and modifications may be made within the scope of the embodiments herein without departing from the spirit thereof, and the embodiments herein include all such modifications.

BRIEF DESCRIPTION OF THE DRAWINGS

The other objects, features, and advantages will occur to those skilled in the art from the following description of the preferred embodiment and the accompanying drawings in which.

Figure 1:
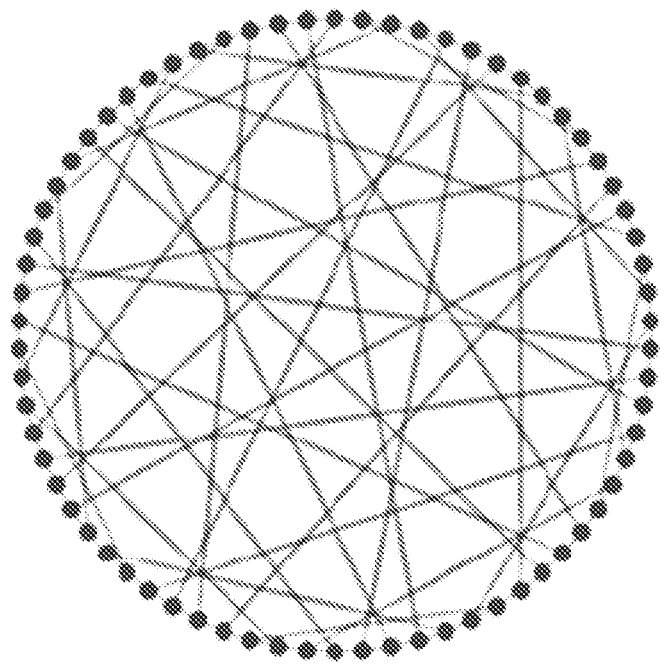
FIG. 1 illustrates a graph with 70 vertices and a symmetry factor of 7 according to one embodiment herein.

Although the specific features of the embodiments herein are shown in some drawings and not in others. This is done for convenience only as each feature may be combined with any or all of the other features in accordance with the embodiments herein.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The various embodiments herein provide the computer-implemented system for creating a model for generating graphs of a regular degree. The system includes a user interface configured to receive a plurality of details of a graph system, a graph generation module communicably coupled to the user interface and configured for generating graphs of regular degree, a graph compression module communicably coupled with the graph generation module and is configured to compress the generated graph, and a database configured for storing a plurality of details of the graph system and the compact representation of the generated graphs.

The user interface is configured to receive the plurality of details through a computing device. Further, the graph is generated in a predetermined format using a plurality of pre-determined parameters.

According to an embodiment herein, the graph generation module is further configured for representing an infinite family of Hamiltonian bipartite graphs of regular degree with Dn chord index notation.

According to an embodiment herein, the graph generation module is further configured to represent an arbitrary graph of regular degree k and order "mk" by a set of permutations $\{p_1, p_2, \ldots p_k\}$, where $p_i \in S_m$ for $1 \le i \le k$, and $p_1 = I_m$, the identity permutation on m elements, and $\{p_1, p_2, \ldots p_k\}$ are compatible permutations.

According to an embodiment herein, the graph generation module is further configured to represent an arbitrary bipartite graph of regular degree k and order "2mk" by a set of permutations $\{p_1, p_2, \ldots p_k\}$, where $p_i \in S_m$ for $1 \le i \le k$, and $p_1 = I_m$, the identity permutation on to elements, and $\{p_1, p_2, \ldots p_k\}$ are compatible permutations.

According to an embodiment herein, the graph generation module is further configured to generate and represent an arbitrary Hamiltonian bipartite graph of regular degree with a lesser number of variables through a generalized Dn chord index representation of a Hamiltonian bipartite graph of a regular degree.

According to an embodiment herein, the representation module represents a an arbitrary Hamiltonian graph of regular degree with a minimum number of variables by a generalized En chord index representation of a Hamiltonian graph of regular degree.

According to an embodiment herein, the graph generation module is further configured to represent an arbitrary graph of regular degree with a minimum number of variables through Pn representation of an arbitrary graph of regular degree.

According to an embodiment herein, the graph generation module is configured to provide an alternate representation for Hamilton bipartite graph of the regular degree through a BPn representation of an arbitrary bipartite graph of a regular degree.

According to an embodiment herein, the graph generation module is configured to provide an alternate representation for Hamilton graph of the regular degree through a Pn representation of an arbitrary graph of a regular degree.

According to an embodiment herein, the method is provided for creating trivalent graphs with 3 m vertices and trivalent bipartite graphs with 6 in vertices. The method further comprises representing a symmetry factor with permutations represented by $p1 = Im$ and $p2 = (2\ 3\ \ldots\ m1)$, and wherein permutation $p3 \in Sm$ is said to have symmetry factor b, and wherein b divides m when p3 is represented by $p3 = (\hat{q}3, m/b)\ (m)$, and wherein p3 is obtained by modular multiplication from $\hat{q}3$ by symmetry factor b.

According to an embodiment herein, the system further comprises a plurality of file systems configured to automatically convert graphs of categories in a compressed format in a selected application into a compressed form to save a storage space in the database.

According to an embodiment herein, each of the modules includes an administrator module that is configured for monitoring and modifying the activities, wherein the activities are monitored and modified to set a pre-determined threshold, and determine or estimate a type of representation based on the received inputs.

According to an embodiment herein, the computing device is selected from a group consisting of a desktop computer, a laptop computer, a palmtop computer, a cluster computer, a supercomputer, a server, a wearable device, a smart television, a kiosk, a mainframe computer, and a graph rendering system.

According to an embodiment herein, the graph representation formats that are introduced as part of this application are in a compressed format.

According to an embodiment herein, the actual graph or its complete adjacency list are represented in an uncompressed format of the graph.

The various embodiments herein, provide a computer-implemented method for representing graphs of a regular degree. The method includes, receiving a plurality of details of a graph through a user interface of a computing device, generating a plurality of graphs of regular degree in a predetermined format through a graph generation module, compressing the generated graph using a graph generation module, representing the compressed graph using a graph representation module, and storing a plurality of details of the graph in a database, wherein the plurality of details include details of the received inputs.

According to an embodiment herein, the details of a graph are received through a computing device. Further, the generated plurality of graphs are based on the first set of predetermined parameters. The compressed graphs are compatible with a plurality of computing devices.

According to an embodiment herein, the plurality of details stored in the database includes details of the received inputs, the details of the first set of predetermined parameters, the details of the second set of predetermined parameters, plurality of compressed representation of the graphs, protocols required for compression, plurality of protocols required for representation of the compressed graphs, and the metadata of graphs and the graph system.

According to an embodiment herein, the method further includes representing an infinite family of Hamiltonian bipartite graphs of regular degree with Dn chord index notation.

According to an embodiment herein, the method further comprises representing an arbitrary graph of regular degree k and order "mk" by a set of permutations $\{p_1, p_2 \ldots p_k\}$, where $p_i \in S_m$ for $1 \le i \le k$, and $p_1 = I_m$, the identity permutation on m elements, and $\{p_1, p_2, \ldots p_k\}$ are compatible permutations.

According to an embodiment herein, the method further comprises representing an arbitrary bipartite graph of regular degree k and order "2mk" by a set of permutations $\{p_1,$ $p_2, \ldots p_k\}$, where $p_i \in S_m$ for $1 \leq i \leq k$, and $p_1 = I_m$, the identity permutation on m elements, and $\{p_1, p_2, \ldots p_k\}$ are compatible permutations.

According to an embodiment herein, the method is further configured to generate and represent an arbitrary Hamiltonian bipartite graph of regular degree with a minimum number of variables through a generalized Dn chord index representation of a Hamiltonian bipartite graph of a regular degree.

According to an embodiment herein, the method further comprises generating an arbitrary Hamiltonian graph of regular degree with a minimum number of variables by a generalized En chord index representation of a Hamiltonian graph of regular degree.

According to an embodiment herein, the method further comprises generating an arbitrary graph of regular degree with a minimum number of variables through Pn representation of an arbitrary graph of regular degree.

According to an embodiment herein, the method further comprises providing an alternate representation for Hamilton bipartite graph of the regular degree through a BPn representation of an arbitrary bipartite graph of a regular degree.

According to an embodiment herein, the method further comprises providing an alternate representation for Hamilton bipartite graph of the regular degree through a Pn representation of an arbitrary graph of the regular degree.

According to an embodiment herein, the method is provided for generating a model for creating trivalent graphs with 3 m vertices and trivalent bi-partite graphs with 6 m vertices. The method further comprises representing a symmetry factor with permutations represented by $p_1 = I_m$ and $p_2 = (2\ 3\ \ldots\ m\ 1)$ and wherein permutation $p_3 \in S_m$ is said to have symmetry factor b, and wherein 1, is divided by m, when p3 is represented by p3 (q̂3, m/b) (m), and wherein p3 is obtained by modular multiplication from q̂3 by symmetry factor b.

According an embodiment herein, the method further comprises a plurality of file systems configured to automatically convert graphs of categories in a selected application into a compressed form to save a storage space in the database.

According to an embodiment herein, each of the modules includes an administrator module that is configured for monitoring and modifying the activities, wherein the activities are monitored and modified to set a pre-determined threshold, and determine or estimate a type of representation based on the received inputs.

The various embodiments herein provide a system and method for compact representation of graphs of a regular degree. The graphs of regular degree are represented in a compact manner using a plurality of representation methods.

The embodiments herein provide a notional permutation method for representing a Hamiltonian bipartite graph and can also be generalized to be equivalent to the generalized Dn chord index representation of Hamiltonian bipartite graph of a regular degree.

The representations of an arbitrary trivalent Hamiltonian bipartite graph with the lesser number of variables is achieved by D3 chord index representation for a trivalent Hamiltonian bipartite graph.

The representation of an arbitrary trivalent Hamiltonian graph with the lesser number of variables is achieved by E3 chord representation of a trivalent Hamiltonian graph.

The representation of an arbitrary Hamiltonian bipartite graph of regular degree with a lesser number of variables is achieved by generalized Dn chord index representation of a Hamiltonian bipartite graph of a regular degree.

The representation of an arbitrary Hamiltonian graph of regular degree with a lesser number of variables is achieved by generalized En chord index representation of a Hamiltonian graph of a regular degree.

The representation of an arbitrary graph of regular degree with a lesser number of variables is achieved by Pn representation of an arbitrary graph of a regular degree.

The BPn representation of an arbitrary bipartite graph of regular degree provides an alternate representation method for Hamilton bipartite graph of a regular degree.

$\{p_3 \ldots p_k\}$ is an alternate representation method for Hamiltonian bipartite graph of regular degree k and order 2mk.

$\{p_3 \ldots p_k\}$ representation method for Hamiltonian graph of regular degree k and order mk.

According to an embodiment herein, generalized Dn chord index representation of D3 chord index representation for a trivalent Hamiltonian bipartite graph. According to an embodiment of the embodiments herein, generalized En chord index representation of a Hamiltonian graph of regular degree is a generalization of E3 chord index representation for a trivalent Hamiltonian graph.

According to an embodiment herein, not every D3 chord index representation represents a trivalent Hamiltonian, bipartite graph, but every trivalent Hamiltonian bipartite graph has a D3chord index representation.

According to an embodiment herein, not every E3chord index representation represents a trivalent Hamiltonian graph, but every trivalent Hamiltonian graph has an E3 chord index representation.

According to an embodiment herein, not every generalized Dn chord index representation represents a Hamiltonian bipartite graph of regular degree, but every Hamiltonian bipartite graph of regular degree has a generalized Dn chord index representation.

According to an embodiment herein, not every generalized En chord index representation represents a Hamiltonian graph of regular degree, but every Hamiltonian graph of regular degree has a generalized En chord index representation.

According to an embodiment herein, any arbitrary bipartite graph of regular degree k and order 2km can be represented by a set of permutations, $\{p_1, p_2, \ldots, p_k\}$ where $p_i \in S_m$ for $1 \leq i \leq k$, and $p_1 = I_m$, the identity permutation on m elements, and $\{p_1, p_2, \ldots, p_k\}$ are compatible permutations. The $S_m$ is the symmetric group of degree m.

For example, any arbitrary bipartite graph of regular degree 3, and order 6m is represented by a set of permutations, $\{p_1, p_2, p_3\}$ where $p_i \in S_m$ for $1 \leq i \leq 3$, and $p_1 = I_m$, the identity permutation on m elements, and $\{p_1, p_2, p_3\}$ are compatible permutations.

According to an embodiment herein, any arbitrary graph of regular degree k, and order km is represented by a set of permutations, $\{p_1, p_2, \ldots, p_k\}$ where $p_i \in Sm$ for $1 \leq i \leq k$, and $p_1 = I_m$, the identity permutation on m elements, and $\{p_1, p_2, \ldots, p_k\}$ are compatible permutations.

According to an embodiment herein, the compact representation of the Hamiltonian trivalent bipartite graph is possible using fewer variables compared to the entire adjacency list.

According to an embodiment herein, the compact representation of the Hamiltonian trivalent bipartite graph is possible using fewer variables compared to the LCF notation.

TABLE 1

Types of Graphs and Notations

| Graph | D3chord Indices | E3 chord indices | LCF Notation |
|---|---|---|---|
| Hamiltonian Trivalent Non-Bipartite graphs | No | Yes | Yes |
| Hamiltonian Trivalent Bipartite Graphs | Yes | Yes | Yes |

TABLE 2

LCF Notation and Extended LCF Notation for $C_{(3, 10) B}$ with 70 vertices

| LCF Notation | Extended LCF Notation |
|---|---|
| [−29, −19, −13, 13, 21, −27, 27, 33, −13, 13, 19, −21, −33, 29]$^5$ | Nil |

According to an embodiment herein, the LCF notation is traditionally used to represent trivalent Hamiltonian graphs. D3 chord index notation is twice as compact as the LCF notation for representing trivalent Hamiltonian bipartite graphs. E3 chord index notation is twice as compact as the LCF notation for representing trivalent Hamiltonian graphs. Even though the generalized LCF notation is more compact than LCF notation, it is not as general as E3 and D3 chord index notation.

According to an embodiment herein, D3 chord index notation is used for representing an infinite family of trivalent Hamiltonian bipartite graphs.

According to an embodiment herein, generalized Dn chord index notation is used for representing an infinite family of Hamiltonian bipartite graphs of a regular degree.

TABLE 3

D3 chord indices and E3 chord indices for $C_{(3, 10) B}$ with 70 vertices and b = 7

| D3 chord Indices | E3 chord indices |
|---|---|
| 9, 13, 29, 21, 13, 43, 33 | 9, 57, 37, 29, 21, 57, 43 |

FIG. 1 illustrates a graph with 70 vertices and a symmetry factor of 7, according to one embodiment of the embodiments herein.

According to an embodiment herein, the notation $C_{(3, 10)B}$ is used to refer the graph with 70 vertices, symmetry factor 7 and D3 chord indices 9, 13, 29, 21, 13, 43, 33.

According to an embodiment herein, an alternate implementation achieved by replacing the chord index "1" by 2m−1 in each of the chord index representations, where 2m is to number of vertices of the graph.

For example, D3 chord index "5" leads to a (3, 6) Hamiltonian bipartite graph for all even orders greater than or equal to 14. This is proved theoretically and practically verified until order 20008.

In another example, it is observed that the D3 chord indices "15, 53, 73, 139, 243, 267, 471, 651" leads to (3, 16) Hamiltonian bipartite graphs for orders 2352+16i for integers i≥0, for symmetry factor 8. In addition, it is also observed that the above-mentioned D3 chord indices also lead to (3,16) Hamiltonian bipartite graphs for the following order 1824, 1840, 1936, 2016, 2032, 2112, 2144, 2160, 2176, 2240, 2256, 2272, 2288, 2304, 2320.

According to an embodiment herein, the notional permutation method is used for representing a Hamiltonian bipartite graph with rotational symmetry. According to an embodiment herein, the notional permutation method is an alternate formulation of D3 chord index notation and is generalized to be equivalent to the generalized Dn chord index representation of a Hamiltonian bipartite graph of a regular degree.

According to an embodiment herein, the fixed point of a notional permutation $q_3 \in S_b$ is defined as position i such that $q_3.i = i$.

According to an embodiment herein, (a, b) (m)=a+b, if a+b≤m and (a, b) (m) (a+b) mod m if (a+b)>m.

According to an embodiment herein, in modular multiplication of permutations, if q is a truncated version of a∈$S_m$ with b positions, i.e., the corresponding notional permutation q∈$S_b$ such that b is divided by m, then there exists p∈Sm such that p can be generated from q by the following rule, if $i^{th}$ position i of $q_3$ is u, then position (i, m/b) (m) is (u, m/b) (m). The $p_3$=($\hat{q}$, m/b)(m)

For example, the modular multiplication of a permutation in $S_4$ to $S_8$ with matrix and permutation representations m=8, b=4, a=2 is shown in matrix 1.

$$\begin{bmatrix} 0 & 0 & 1 & 0 \\ 0 & 0 & 0 & 1 \\ 1 & 0 & 0 & 0 \\ 0 & 1 & 0 & 0 \end{bmatrix} \rightarrow \begin{bmatrix} 0 & 0 & 1 & 0 & 0 & 0 & 0 & 0 \\ 0 & 0 & 0 & 1 & 0 & 0 & 0 & 0 \\ 1 & 0 & 0 & 0 & 0 & 0 & 0 & 0 \\ 0 & 1 & 0 & 0 & 0 & 0 & 0 & 0 \\ 0 & 0 & 0 & 0 & 0 & 0 & 1 & 0 \\ 0 & 0 & 0 & 0 & 0 & 0 & 0 & 1 \\ 0 & 0 & 0 & 0 & 1 & 0 & 0 & 0 \\ 0 & 0 & 0 & 0 & 0 & 1 & 0 & 0 \end{bmatrix}$$

Matrix 1: (3 4 1 2) → (3 4 1 2 7 8 5 6)

According to an embodiment herein, when $p_1 = I_m$ and $p_2 = (2\ 3\ \ldots\ m\ 1)$, if permutation, $p_3 \in S_m$ can be represented by $p_3 = (\hat{q}_3, a)$ (m) where a is a positive integer, then $\hat{q}_3$ is a known as a truncated permutation.

According to an embodiment herein, the symmetry factor for permutation representation is defined by the following equation. Given $p_1 = I_m$ and $p_2 = (2\ 3\ \ldots\ m\ 1)$, permutation $p_3 \in S_m$ is said to have symmetry factor b, where b|m if $p_3$ can be represented by $p_3 = (\hat{q}_3, m/b)$ (m). $p_3$ is obtained by modular multiplication from $\hat{q}_3$ by symmetry factor b.

Figure 2:
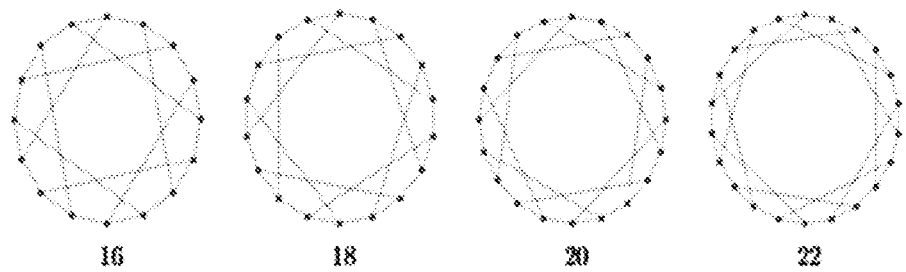
FIG. 2 illustrates graphs with symmetry factor 1, according to one embodiment herein.

According to an embodiment herein, the notional permutation is $q_3 \in S_b$ is represented in the following way. Given permutation $p_3 \in S_m$ and an integer b such that b divides m if $p_3 = (q_3, m/b)$ (m), each position i of notional permutation $q_3 \in S_b$ denoted as $\hat{q}_3$. i is obtained as $\hat{q}_3$.i mod b if $\hat{q}_3$.i=m FIG. 2 illustrates graphs with symmetry factor 1, according to one embodiment herein.

According to an embodiment herein, the two permutations on a set of m elements represented by $(x_1, x_2, \ldots x_m)$; $x_p \neq x_q$, such that $\forall p \neq q$, $1 \leq p \leq m$ for p, q∈N where $1 \leq x_i \leq m$ such that i∈N; $1 \leq i \leq m$, and $(y_1, y_2, \ldots y_m)$ such that $y_p \neq y_q \forall p \neq q$ $1 \leq p \leq m$; $1 \leq q \leq m$ for p, q∈N, where $1 \leq i \leq s$ are compatible if and only if $x_i \neq y_i \forall$ i∈N for $1 \leq i \leq m$.

According to an embodiment'herein, a set, of r permutations on a set of m elements represented by $x_{(i,1)}$, $x_{(1,2)}, \ldots, x_{1,m)}$ $x_{(1,p)} \neq x_{i, q)}$ for ⊄ p≠q, $1 \leq p \leq m$; $1 \leq q \leq m$; for p, q∈N where $1 \leq x_{(i,n)} \leq m$ ⊄ $1 \leq i \leq r$; $1 \leq \alpha \leq m$ for i, α∈N are compatible if and only if $x_{(i,\alpha)} \neq x_{(j,\alpha)}$ ⊄ i≠j; $1 \leq \alpha \leq m$; $1 \leq i \leq r$; $1 \leq j \leq r$ for i, j, α∈N.

According to an embodiment herein, a labelled Hamiltonian trivalent graph with order 2m is said to have symmetry factor b∈N if the following conditions are satisfied b|m The vertices of the labelled Hamilton trivalent graph with order 2m have labels {1, 2, . . . 2m}.

There exists a default Hamiltonian cycle as follows, {1}→{2}→ . . . →{2m}→{1}

The edges that are, not part of the default Hamiltonian cycle are connected as follows. Vertex {i} is connected to vertex up for 1≤i≤2m.

According to an embodiment herein, if j≡i mod 2b for 1≤j≤2b and 1≤i≤2m, then the following is true, {u j}={u j} mod 2m.

According to an embodiment herein, $p_2$=(5 3 4 6 7 1 2) and $p_3$=(4 5 6 7 1 2 3) are compatible permutations.

According to an embodiment herein, $p_2$=(4 3 5 6 7 1 2) and $p_3$=(4 5 6 7 1 2 3) are not compatible permutations.

According to an embodiment herein, the D3 chord indices {$1_1, 1_2, \ldots 1_m$} for order 2m where each $1_i$ is an odd integer satisfying 3≤$1_i$≤2m−3 for 1≤i≤m is a labelled graph with order 2m, with labels {1, 2, 3, . . . , 2m} is constructed as follows:
  a. Vertex {1} is connected to vertex {2m}, vertex {2} and vertex {1+$1_1$}
  b. For integers i satisfying 2≤i≤m, vertex, {2i−1} is connected to the following three vertices with even labels.
    i. Vertex {2i−1} is connected to vertex {2i−2}.
    ii. Vertex {2i−1} is connected to vertex {2i}
    iii. Vertex {2i−1} is connected to vertex {$y_i$}
        Where $y_i$ is calculated as follows.
        1. $y_i$={2i−1+$1_i$} if {2i−1+$1_i$}≤2m.
        2. $y_i$={2i−1+$1_i$} mod 2m if {2i−1+$1_i$}>2m.
  c. According to an embodiment herein, the E3 chord index graph notation with 2m vertices and symmetry factor b where b|m, corresponding to the set of E3 chord indices {$s_1, s_2, \ldots s_b$) where each $s_i$ is an integer satisfying 2≤$s_i$≤2m−2 for 1≤i≤b is labeled the graph with 2m vertices, with labels {1, 2, 3, . . . , 2m} constructed as follows.
  d. Vertex {1} is connected to vertex {2m} and {2}
  e. For integers i satisfying 2≤i≤m, vertex {2i−1} is connected to the following two vertices with even labels.
    i. Vertex {2i−1} is connected to vertex {2i−2}
    ii. Vertex {2i−1} is connected to vertex {2i}.
  f. For integers i satisfying 1≤i≤b, the following steps apply.
    i. If there does not exist 1≤z1≤2b such that all solutions for 1≤z2≤2m satisfying z2≡z1 mod 2b are of degree 2, then graph is not trivalent.
    ii. $v_i$=j is assigned to the minimum vertex label j, such that all vertices z≡mod 2b are of degree 2 and 1≤j≤2b.
    iii. $u_i$ is calculated as follows,
      a. $u_i$={$v_i+s_i$} if {$v_i+s_i$}≤2m.
      b. $u_i$={$v_i s_i$} mod 2m if {$v_i+s_i$}>2m.
    iv. For integers j satisfying 0≤j≤m/b−1, the following steps apply.
      a. $x_{ij}=u_i+2b*j$ and $y_{ij}=v_i+2b*j$
      b. if ($x_{ij}$>2m) then $x_{ij}=x_{ij}$ mod 2m
      c. if ($y_{ij}$>2m) then $y_{ij}=y_{ij}$ mod 2m
      d. Vertex {$x_{i,j}$} is connected to vertex {$y_{i,j}$}.

According to an embodiment herein, the E3 chord indices fix and D3 chord indices for the Hamiltonian, trivalent bipartite graph of order 2m and symmetry factor b is represented in the below table.

TABLE 4 the E3 chord indices for and D3 chord indices for Hamiltonian trivalent bipartite graph of order 2 m and symmetry factor b

| E3 chord Indices | D3 chord indices | LCF notation |
| --- | --- | --- |
| b | B | 2b |

According to an embodiment herein, when m=7 and $p_3$=(4 5 6 7 1 2 3) and $p_4$=(6 7 1 2 3 4 5), the corresponding Hamiltonian bipartite graph of degree 4 and order 14, with hi-adjacency matrix is represented as $$\begin{bmatrix} 1 & 1 & 0 & 1 & 0 & 1 & 0 \\ 0 & 1 & 1 & 0 & 1 & 0 & 1 \\ 1 & 0 & 1 & 1 & 0 & 1 & 0 \\ 0 & 1 & 0 & 1 & 1 & 0 & 1 \\ 1 & 0 & 1 & 0 & 1 & 1 & 0 \\ 0 & 1 & 0 & 1 & 0 & 1 & 1 \\ 1 & 0 & 1 & 0 & 1 & 0 & 1 \end{bmatrix}$$

According to an embodiment herein, the {$p_3 \ldots p_k$} representation method of Hamiltonian graph of degree k and order mk is $p_1=I_m$ and $p_2$=(2 3 . . . m 1).

According to an embodiment herein, when m7 and $p_3$(4 5 6 7 1 2 3) and $p_4$=(6 7 1 2 3 4 5), the Hamiltonian graph of degree 4 and order 7, wide adjacency matrix is represented as:

$$\begin{bmatrix} 1 & 1 & 0 & 1 & 0 & 1 & 0 \\ 0 & 1 & 1 & 0 & 1 & 0 & 1 \\ 1 & 0 & 1 & 1 & 0 & 1 & 0 \\ 0 & 1 & 0 & 1 & 1 & 0 & 1 \\ 1 & 0 & 1 & 0 & 1 & 1 & 0 \\ 0 & 1 & 0 & 1 & 0 & 1 & 1 \\ 1 & 0 & 1 & 0 & 1 & 0 & 1 \end{bmatrix}$$

Figure 3:
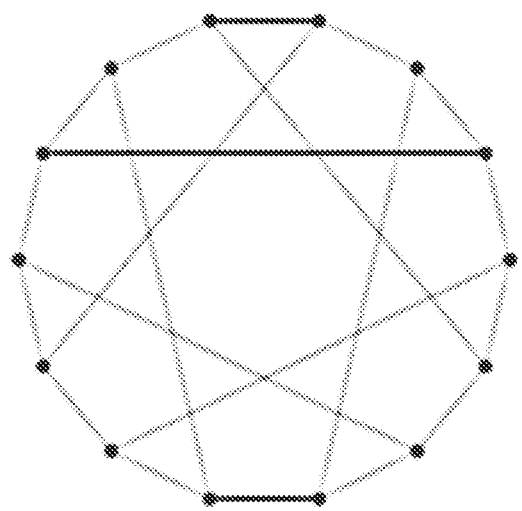
FIG. 3 illustrates a (3, 6) cage obtained as a screenshot from Mathematical software, according to one embodiment herein.

FIG. 3 illustrates a (3, 6) cage obtained as a screenshot from Mathematical software.

Figure 4:
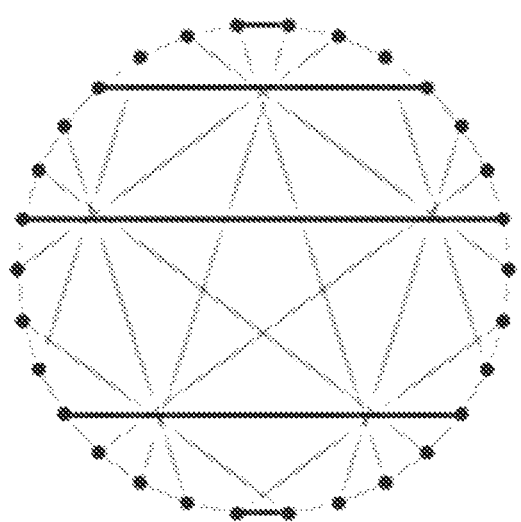
FIG. 4 illustrates a (3, 8) cage found by Tuttle obtained as a screenshot from Mathematical software, according to one embodiment herein.

FIG. 4 illustrates a (3, 8) cage found by Tutte obtained as a screenshot from Mathematical software.

According to an embodiment of the embodiments herein, the (3, 8) cage is represented with order 30, and symmetry factor 3 m the following truncated permutations:
  8 7 12 (Notional Permutation 2 1 3)
  6 3 15 (Notional Permutation 2 1 3)
  06 11 07 (Notional Permutation 3 2 1)
  12 14 10 (Notional Permutation 3 2 1)
  10 6 08 (Notional Permutation 1 3 2)
  13 9 14 (Notional Permutation 1 3 2)

According to an embodiment herein, graphs are of a considerable amount of contemporary interest due to the recent widespread interest in social networks.

According to an embodiment herein, graph representation formats for specifying graphs concisely have practical significance in the creation of error correction codes that have applications in communication systems and storage devices.

Figure 5:
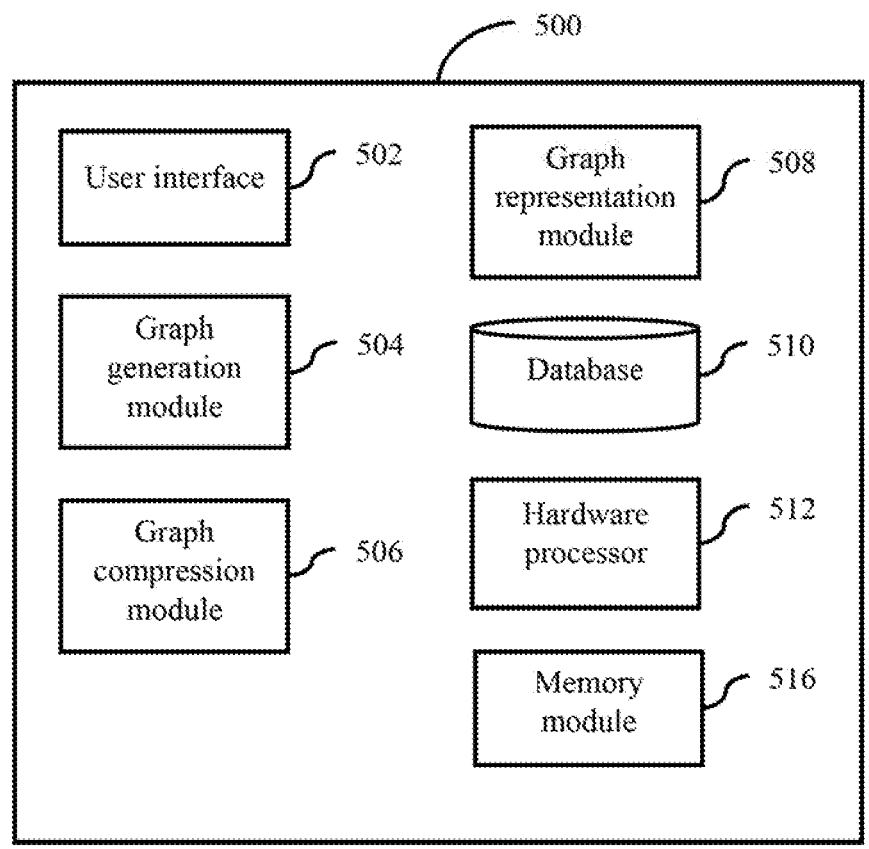
FIG. 5 illustrates a system diagram for compact representation of graphs, according to an embodiment herein.

FIG. 5 illustrates a system diagram for compact representation of graphs, according to an embodiment herein. The system includes a user interface 502, a graph generation module 504, a graph compression module 506, a graph representation module 508, a database 510, a hardware processor 512, and a memory module 516.

The user interface 502 forms a front-end of the system and receives inputs frond a plurality of sources. The plurality of the sources includes input received from a human and an input received from a machine-generated process. The user interface is communicably coupled to a client device on which the compressed representation of the graph has to be rendered. The examples of the client device include, but are not limited to a desktop computer, a laptop computer, a cluster computer, a super computer, a wearable device, a mainframe computer, a telecommunication system, an integrated circuit.

The system further includes a graph generation module 504 that generates graphs based on the inputs received through the user interface 502. The generation of the graphs is based oil the first pre-determined set of parameters. The first pre-determined set of parameters is set by the administrator of the system. According to an embodiment herein, the predetermined parameters are selected using a machine learning and artificial intelligence techniques.

The system also includes the graph compression module 506 that compresses the graph according to the second set of pre-determined set of parameters. The second set of pre-determined parameters is set by the administrator of the system. Further, the pre-determined parameters are set by the system itself based on the graph generated from the graph generation module 504. The compressed graph is generated based on the need of the application of the graph. For example, the applications include, but are not limited to routing telecommunication network, handling network traffic, analyzing DNA sequences, ranking orders of the results, and the like. According to an embodiment herein, the compression methods followed for each of the application has a set of different pre-determined parameters. The graph compression module 506 is communicably coupled to the graph generation module 504.

The graph representation module 508 represents the compressed graph on the client computing device. The graph representation module 508 represents the compressed graph based on the inputs received from the graph compression module 506.

The system includes the database 510, which stores a plurality of data and information of each of the modules and also stores the results generated from each module. Further, the database 510 stores a plurality of protocols used for operating each module, and also the system used for representing the compressed graphs. According to an embodiment herein, the database 510 has an option to be expanded.

Further, the system includes the hardware processor 512 which executes instructions and processes the inputs received by each module and provides outputs. According to an embodiment herein, the hardware processor 512 has a plurality of configurations including but not limited to a single core processor, dual-core processor, multi-core processor, dedicated graph processor and the like. The hardware processor 512 is communicably coupled with all the modules of the graph representation system 500.

The memory module 516 is a hardware device used for storing information for immediate use of the system. The memory module 516 includes random access memory, read-only memory, cache memory, virtual memory, external memory among others.

The various embodiments herein provide a method for compact representation of graphs of a regular degree. At first, a plurality of details of a graph is received through a user interface of a computing device. The computing device is a client device that has the capability to communicate with other devices using a communication network. The examples of the computing device include, but are not limited to a laptop computer, supercomputer, desktop computer, cluster computer, wearable device, telecommunication systems, smart-television, and the like.

Once the system receives the plurality of details from the computing device, a plurality of graphs of a regular degree in a predetermined format is generated. The plurality of graphs of regular degree is generated using a graph generation module. The generated graph is based on the predetermined format. The predetermined format is based on a plurality of parameters set by the system administrator based on the requirements of the system and application.

Further, the generated graph is compressed using a graph compression module. The compression of the graph is based on a plurality of the second set of predetermined parameters. The predetermined parameters are set by the system administrator and are set based on the application of the graph. According to an embodiment of the embodiments herein, the predetermined parameters are modified dynamically based on the needs of the system and the application.

Once the graphs are compressed, the compressed graphs are represented on the computing device using a graph representation module. The representation of the graph is based on the application of the graph.

Further, the generated graphs and the compressed graphs are stored in a database. Further, the database also stores a plurality of other details related to other systems, such as protocols to be followed by each module, conflict resolving protocols, memory management protocols, and the like. According to an embodiment of the embodiments herein, all the details relating to the graph system is stored in a single database. According to an embodiment of the embodiments herein, all the details relating to the graph system and the representation of each of graphs is stored in a plurality of database which is accessible using a plurality of database query techniques.

Figure 6:
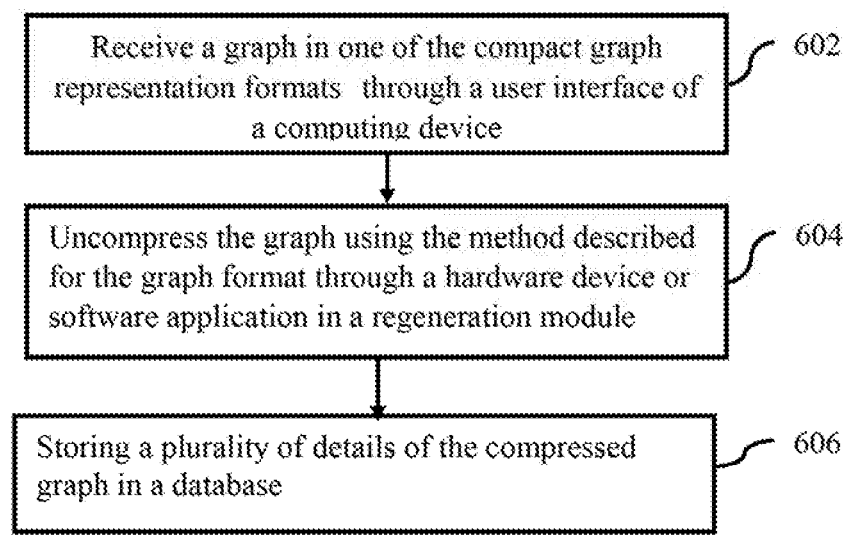
FIG. 6 illustrates a flowchart illustrating a method of decompressing a received compact representation of graphs, according to an embodiment herein.

With respect to FIG. 6, a graph in one of the compact graph representation formats is received through a user interface of a computing device (602). The graph received in one of the compact representation format is uncompressed using a method described for the graph format with a hardware device or software application in a regeneration module (604). A plurality of details of the compressed graph is stored in a database (606).

Further, the generated graphs and the compressed graphs are stored in a database. Further, the database also stores a plurality of other details related to other systems, such as protocols to be followed by each module, conflict resolving protocols, memory management protocols, and the like.

According to an embodiment of the embodiments herein, all the details relating to the graph system is stored in a single database. According to an embodiment of the embodiments herein, all the details relating to the graph system and the representation of each of graphs is stored in a plurality of database which is accessible using a plurality of database query techniques.

Figure 7:
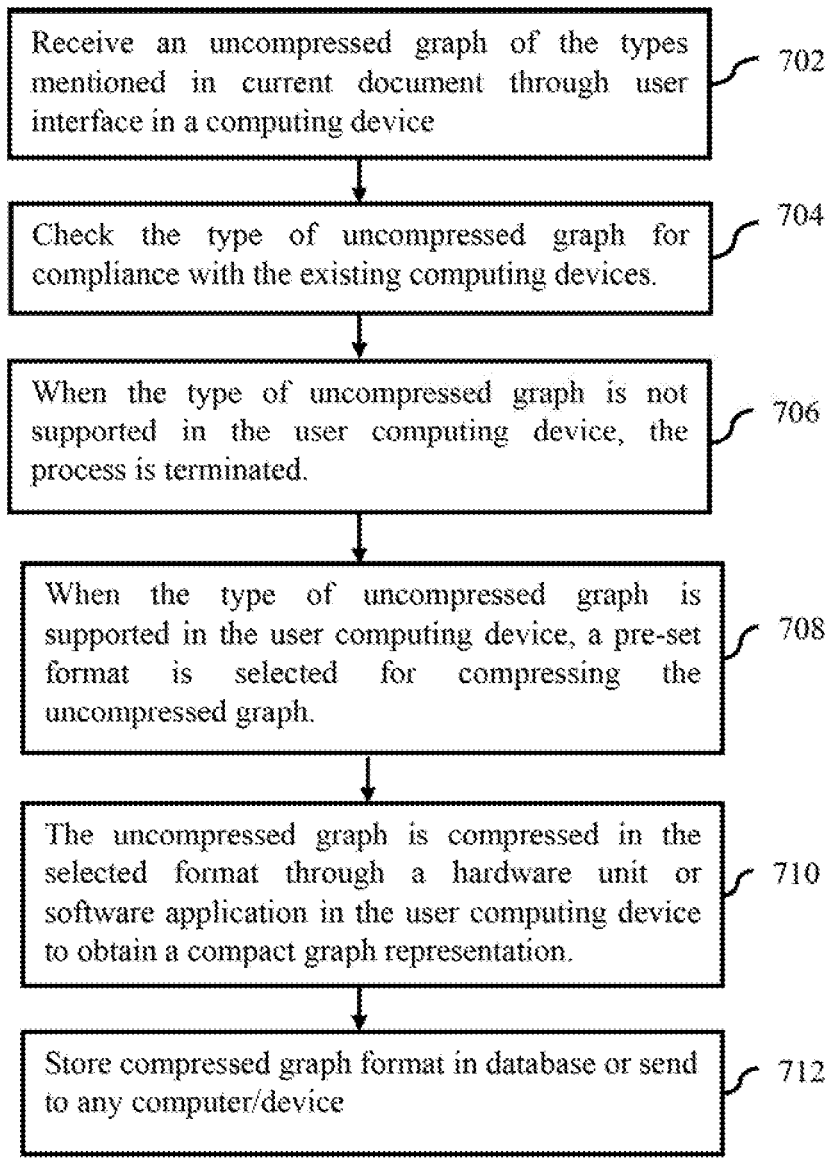
FIG. 7 illustrates a flowchart illustrating a method of decompressing a received compact representation of graphs that are in a compressed condition, according to an embodiment herein.

With respect to FIG. 7, the uncompressed graph is compressed in the selected format through a hardware unit or software application in the user computing device to obtain a compact graph representation (702). An uncompressed graph of the types mentioned in current document is received through user interface in a computing device (704). The type of uncompressed graph is checked for compliance with the existing computing devices (706). When the type of uncompressed graph is not supported in the user computing device, the process is terminated (708). When the type of uncompressed graph is supported in the user computing device, a pre-set format is selected for compressing the uncompressed graph (710). The compressed graph format is stored in database or sent to any computer/device through wired or wireless networks (712).

Therefore, the various embodiments herein provide a method and system for compact representation of regular graphs.

The embodiments herein provide ease of representation of the regular graph. Further, the embodiments herein allow representation of an infinite family of Hamilton bipartite graphs of a regular degree.

Further, the embodiments herein provide an ease of representation and compression by using a minimum number of variables to represent, and hence save storage space.

The foregoing description of the specific embodiments will so fully reveal the general nature of the embodiments herein that others can, by applying current knowledge, readily modify and/or adapt for various applications such as specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modifications. However, all such modifications are deemed to be within the scope of the claims.

What is claimed is:

1. A computerized system comprising hardware processor and memory for generating a model for creating graphs of regular degree through an algorithm or application, the system comprising:

a user interface configured to receive a plurality of details of a graph system, and wherein the user interface is configured to receive the plurality of details through a computing device through an algorithm or application;

a graph generation module communicably coupled to the user interface and run on a hardware processor and configured for generating graphs of regular degree, and wherein the graph is generated in a predetermined format using a plurality of pre-determined parameters through an algorithm or application;

a graph compression module communicably coupled with the graph generation module and wherein the graph compression module is run on the hardware processor and configured to compress the graph, and wherein the generated graph is compressed based on a plurality of predetermined parameters through an algorithm or application;

a graph representation module communicable coupled with the graph compression module and wherein the graph representation module is run on the hardware processor and configured to represent the compressed graph in a format which is compatible with a plurality of computing devices through an algorithm or application;

a database configured for storing a plurality of details of the graph system and the compact representation of the generated graphs;

wherein the graph generation module is further configured for representing an infinite family of Hamiltonian bipartite graphs of regular degree with Dn chord index notation, and wherein the graph generation module is configured to generate trivalent graphs with 3m vertices and trivalent bi-partite graphs with 6m vertices with a symmetry factor having permutations representations by $p_1=I_m$ and $p_2=(2\ 3\ \ldots\ m1)$, and wherein permutation $p_3 \in S_m$ is said to have symmetry factor b, and wherein m is divided by b, when $p_3$ is represented by $p_3=(\hat{q}_3, m/b)$ (m), and wherein $p_3$ is obtained by modular multiplication from $\hat{q}_3$ by symmetry factor b.

2. The system according to claim 1, wherein the graph generation module is further configured to represent an arbitrary graph of regular degree k and order "mk" by a set of permutations $\{p_1, p_2, \ldots p_k\}$, where $p_i \in S_m$ for $1 \le i \le k$, $p_1=I_m$, the identity permutation on m elements, and $\{p_1, p_2, \ldots p_k\}$ are compatible permutations.

3. The system according to claim 1, wherein the graph generation module is further configured to represent an arbitrary bipartite graph of regular degree k and order "2mk" by a set of permutations $\{p_1, p_2 \ldots p_k\}$, where $p_i \in S_m$ for $1 \le i \le k$, and $p_1=I_m$, the identity permutation on m elements, and $\{p_1, p_2, \ldots p_k\}$ are compatible permutations.

4. The system according to claim 1, wherein the graph generation module is further configured to generate and represent Hamiltonian bipartite graph of regular degree with a minimum number of variables through a generalized Dn chord index representation of the Hamiltonian bipartite graph of a regular degree.

5. The system according to claim 1, wherein the representation module represents an arbitrary Hamiltonian graph of regular degree with a minimum number of variables by a generalized $E_n$ chord index representation of the Hamiltonian graph of regular degree.

6. The system according to claim 1, wherein the graph generation module is further configured to represent an arbitrary graph of regular degree with a minimum number of variables through $P_n$ representation of an arbitrary graph of regular degree.

7. The system according to claim 1, wherein the graph generation module is configured to provide an alternate representation for Hamilton bipartite graph of the regular degree through a $BP_n$ representation of an arbitrary bipartite graph of a regular degree.

8. The system according to claim 1, wherein the graph generation module is configured to provide an alternate representation for Hamilton graph of the regular degree through a $P_n$ representation of an arbitrary graph of a regular degree.

9. The system according to claim 1, further comprises a plurality of file systems configured to automatically convert graphs of categories in a selected application into a compressed form to save a storage space in the database.

10. The system according to claim 1, wherein each of the module includes an administrator module that is configured for monitoring and modifying the activities through an algorithm or application, wherein the activities are monitored and modified to set a pre-determined threshold, and determine or estimate a type of representation based on the received inputs.

11. The system according to claim 1, wherein the computing device is selected from a group consisting of a desktop computer, a laptop computer, a palmtop computer, a cluster computer, a supercomputer, a server, a wearable device, a smart television, a kiosk, a mainframe computer, and a graph rendering system.

12. A computer implemented method comprising instructions stored on a non-transitory computer-readable storage medium and executed on a hardware processor provided in a computing device provided with a memory for generating a model for creating graphs of regular degree through an algorithm, or application, the method comprising the steps of: receiving a plurality of details of a graph through a user interface of a computing device through an algorithm or application, wherein the details of a graph are received though a computing device; generating a plurality of graphs of a regular degree in a predetermined format through a graph generation module through an algorithm or application, and wherein the generated plurality of graphs are based on the first set of predetermined parameters; compressing the generated graph using a graph generation module through an algorithm or application, and wherein the compressed graphs are generated using the second set of predetermined parameters; representing the compressed graph using a graph representation module through an algorithm or application, wherein the compressed graph is compatible with a plurality of computing devices; storing a plurality of details of the graph in a database through an algorithm or application, wherein the plurality of details' include details or the received inputs, the details of the first set of predetermined parameters, the details of the second set of predetermined parameters, plurality of compressed representation of the graphs, protocols required for compression, plurality of protocols required for representation of the compressed graphs, and the metadata of graphs and the graph system; a database configured for storing a plurality of details of the graph system and the compact representation of the generated graphs; representing an infinite family of Hamiltonian bipartite graphs of regular degree with Pn chord index notation; and creating trivalent graphs with 3m vertices and trivalent bi-partite graphs with 6m vertices having a symmetry factor with permutations is represented by $p_1=I_m$ and $p_2=(2, 3, \ldots m1)$, and wherein $p_3$ $p_1 \varepsilon S_m$ symmetry is said to have symmetry factor b, and wherein m is divided by b when $p_3$ is represented by $p_3=(q_3, m/b)(m)$, and wherein $p_3$ is obtained by modular multiplication from $q_3$ by symmetry factor b.

13. The method according to claim 12, further comprises representing an arbitrary graph of regular degree k and order "mk" by a set of permutations $\{p_1, p_2, \ldots p_k\}$, where $p_1 \in S_m$ for $1 \le i \le k$, and $p_1=I_m$, the identity permutation on m elements, and $\{p_1, p_2, \ldots p_k\}$ are compatible permutations.

14. The method according to claim 12, further comprises representing an arbitrary bipartite graph of regular degree k and order "2mk" by a set of permutations $\{p_1, p_2, \ldots p_k\}$, where $p_1 \in S_m$ for $1 \le i \le k$, and $p_1=I_m$, the identity permutation on m elements, and $\{p_1, p_2, \ldots p_k\}$ are compatible permutations.

15. The method according to claim 12, further comprises generating and representing an arbitrary Hamiltonian bipartite graph of regular degree with a minimum number of variables through a generalized Dn chord index representation of Hamiltonian bipartite graph of the regular degree.

16. The method according to claim 12, further comprises representing an arbitrary Hamiltonian graphs of regular degree with a minimum number of variables by a generalized $E_n$ chord index representation of a Hamiltonian graph of regular degree.

17. The method according to claim 12, further comprises representing an arbitrary graph of regular degree with a minimum number through Pn representation of an arbitrary graph of regular degree.

18. The method according to claim 12, further comprises providing an alternate representation for Hamilton bipartite graph of the regular degree through a $BP_n$ representation of an arbitrary bipartite graph of the regular degree.

19. The method according to claim 12, further comprises providing an alternate representation for Hamilton bipartite graph of the regular degree through a $P_n$ representation of an arbitrary graph of the regular degree.

20. The method according to claim 12, further comprises a plurality of file systems configured to automatically convert graphs of categories in a selected application into a compressed form to save a storage space in the database.

* * * * *